(12) United States Patent
Nishiura et al.

(10) Patent No.: US 7,221,414 B2
(45) Date of Patent: May 22, 2007

(54) LIQUID CRYSTAL DISPLAY DEVICE WITH PERFORATED JOINT PIECES ATTACHABLE BY SCREWS

(75) Inventors: Masayoshi Nishiura, Tottori (JP); Toshio Ikeuchi, Tottori (JP); Satoshi Takasaki, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 167 days.

(21) Appl. No.: 11/165,494

(22) Filed: Jun. 24, 2005

(65) Prior Publication Data

US 2005/0285993 A1 Dec. 29, 2005

(30) Foreign Application Priority Data

Jun. 24, 2004 (JP) .............................. 2004-186741

(51) Int. Cl.
*G02F 1/1333* (2006.01)

(52) U.S. Cl. .......................................... 349/58; 349/59

(58) Field of Classification Search ..................... None
See application file for complete search history.

(56) References Cited

U.S. PATENT DOCUMENTS

| | | | |
|---|---|---|---|
| 6,424,391 B1 | 7/2002 | Tsukamoto et al. | |
| 6,507,484 B2 * | 1/2003 | Fukuyoshi | 361/681 |
| 7,095,462 B2 * | 8/2006 | Ahn | 349/58 |
| 2002/0126236 A1 | 9/2002 | Hiratsuka et al. | |
| 2004/0114372 A1 | 6/2004 | Han et al. | |

FOREIGN PATENT DOCUMENTS

| | | |
|---|---|---|
| FR | 2 800 564 | 5/2001 |
| JP | 11-183926 | 7/1999 |
| JP | 2001-075485 | 3/2001 |
| JP | 2001-305971 | 11/2001 |
| JP | 2003-015150 | 1/2003 |

* cited by examiner

*Primary Examiner*—Andrew Schechter
*Assistant Examiner*—Richard H Kim
(74) *Attorney, Agent, or Firm*—Katten Muchin Rosenman LLP

(57) ABSTRACT

The liquid crystal display device of the present invention is a liquid crystal display device where a light source (160) is disposed on the inner periphery of a liquid crystal module (100), which has a metal front frame (110) and a metal back cover (120), which constitute the housing of the liquid crystal module (100), and a conductive upper case (140) which is laid between a liquid crystal panel (130) and the light source (160) and has a frame having approximately the same shape as that of the front frame 110, in which perforated joints, which are bent vertically and integrally formed on the outer end portions of the front frame, the outer end portions of the upper case (140) and the outer end portions of the back cover (120) are severally provided at positions overlapping with each other when the liquid crystal module (100) is assembled, and the joints (143) of the upper case (140) are sandwiched between the joints (112) of the front frame and the joints (123) of the back cover (120) in order to make the joints attachable to each other with the aid of screws (190) with a foot length less than the width of the front frame. A liquid crystal display device is thereby obtained according to the present invention, in which highly reliable ground connection is realized even when used in an environment subject to frequent vibration.

8 Claims, 3 Drawing Sheets

LIQUID CRYSTAL DISPLAY DEVICE WITH PERFORATED JOINT PIECES ATTACHABLE BY SCREWS

CROSS-REFERENCE TO RELATED APPLICATIONS

This application claims priority to Japanese Patent Application No. 2004-186741, filed on Jun. 24, 2004, the contents of which are incorporated herein by reference.

BACKGROUND OF THE INVENTION

1. Field of the Invention

The present invention relates to a liquid crystal display device, particularly to a liquid crystal display device having high definition display and capable of realizing secure ground connection even when used in an environment subject to frequent vibration.

2. Background Art

Conventionally, it has been known that noise generated from the cold cathode tube of a backlight arranged on the backside of a liquid crystal panel adversely affects the display quality of the liquid crystal panel. A technique designed to address this problem has been disclosed in Japanese Patent Laid-Open Publication No. 2001-75485 pertaining to a flat display device, where the member (shield member) having electrical conductivity is arranged around a cold cathode tube, the electrically conductive member being connected to a front frame (bezel cover) to reduce noise.

In addition, Japanese Patent Laid-Open Publication No. 11-183926 pertaining to an attachment structure of foil-state earth wire for a liquid crystal display device, Japanese Patent Laid-Open Publication No. 2001-305971 pertaining to a display device, as well as Japanese Patent Laid-Open Publication No. 2003-15150 pertaining to a liquid crystal panel electrically conductive connection structure, have also been introduced to address such problem. However, the conventional technique is beset with problems.

Specifically, if connection between the shield member and the front frame or the like was in a simple contact state, the connection becomes unstable due to impact or vibration, affecting display quality. Particularly, when the liquid cystal display device is used in an environment subject to frequent vibration or to which impact is easily applied, a joint portion of the device becomes fatigued upon prolonged use depending on the connecting material or connecting mode, resulting in a change in ground pressure change or contact failure.

Further, while the liquid crystal display device has an advantage over the CRT display device because its housing is smaller than that of the latter, problems arise when it is mounted on certain products. For example, the device is required to be as small as possible, keeping the display area fixed and limiting the number of convex portions provided on the housing to as few as possible in order to allow greater freedom in product design.

However, in the technique disclosed in Japanese Patent Laid-Open Publication Nos. 11-183926 and 2001-305971, convex portions are provided on the periphery of the housing and the housing is grounded from a convex portion. Further, while convex portions are not similarly provided in the technique disclosed in Japanese Patent Laid-Open Publication No. 2003-15150, the housing has a special clamped structure, thereby increasing the thickness of the housing. Further, in the technique disclosed in Japanese Patent Laid-Open Publication Nos. 2001-75485 and 2003-15150, a special grounding member is used, which decreases efficiency of the assembly operation, causing increased production cost.

SUMMARY OF THE INVENTION

The present invention has been created to address the above-mentioned problems, and therefore seeks to provide a technique where highly reliable ground connection can be obtained even when the liquid crystal display device is used in an environment subject to frequent vibration.

The invention also aims to provide the display surface of a liquid crystal display device with a small housing capacity and substantially having no convex portion in the periphery of the device.

To achieve the foregoing objectives, the liquid crystal display device according to Claim 1 is a liquid crystal display device where a light source is arranged on the inner periphery of a liquid crystal module, which has a metal front bezel and a metal back cover, which constitute the housing of the liquid crystal module, and a conductive shield member which is laid between a liquid crystal panel and the light source, and has a frame having approximately the same shape as that of the front bezel, in which perforated joint pieces, which are bent vertically and integrally formed on the outer end portions of the front bezel, the outer end portions of the shield member and the outer end portions of the back cover are severally provided at positions overlapping with each other when the liquid crystal module is assembled, and the perforated joint pieces of the shield member are sandwiched between the perforated joint pieces of the front bezel and the perforated joint pieces of the back cover in order to make the joint pieces attachable to each other by screws.

Specifically, in the invention according to Claim 1, the screws do not directly fasten the shield member, which is attached between metal pieces (sheet metal), where fatigue does not occur. Further, since the screws are attached from the side, the width of the housing is not increased, and convex portions are not formed on the sides of the housing. Naturally of course, the housing is grounded separately.

Further, the liquid crystal display device of Claim 2 is the liquid crystal display device according to Claim 1, in which the pedestal of a liquid crystal control circuit board is further laid between the light source and the back cover, while perforated joint pieces that are bent vertically in relation to the surface of the liquid crystal control circuit board are provided integrally on the outer end portions of the pedestal, and are also made attachable with the aid of screws.

Specifically, in the invention according to Claim 2, the pedestal of the circuit board can be affixed to the housing from the side, such that the pedestal as well as the circuit board are both horizontally and vertically affixed to the liquid crystal surface, as a result of which they are less affected by the effects of vibration, such as slippage and shaking.

Furthermore, the liquid crystal display device of Claim 3 is the liquid crystal display device according to Claim 1 or 2, in which the end portions of the front bezel and the back cover are bent to provide side portions constituting the sides of the housing, and one of the side portions is made to serve as a perforated joint piece.

Specifically, in the liquid crystal display device according to Claim 3, the perforated joint pieces are formed simply by opening holes on the side portions of the housing. Further, except for its liquid crystal surface, the periphery of the liquid crystal display device is encased in a metal housing, such that it is not easily affected by other electromagnetic waves and high quality display can thus be achieved. Note that the side portions of the housing may have overlapping areas, similar to the relation between an outer box and an inner box, by way of example. Furthermore, the side portions do not have to be equipped with four sides like the outer box and the inner box, and for instance, one side of the back cover may be formed without having a bent piece for forming the upper side.

Further, the liquid crystal display device of Claim 4 is the liquid crystal display device according to any one of Claims 1 to 3, in which the housing is a rectangular parallelepiped having substantially no convex portion, and is a liquid crystal display device designed for automobiles, ships or aircraft.

Specifically, according to Claim 4 of the invention, since the housing is a substantially rectangular parallelepiped, which means that the housing may have recesses for screws or the like, greater freedom in product design is made possible.

PREFERRED EMBODIMENTS OF THE INVENTION

Embodiments of the present invention will hereafter be described in detail with reference to the drawings. Specifically, description will be made for a liquid crystal module for automobiles, in which vibration is a constant factor when in use.

Figure 1:
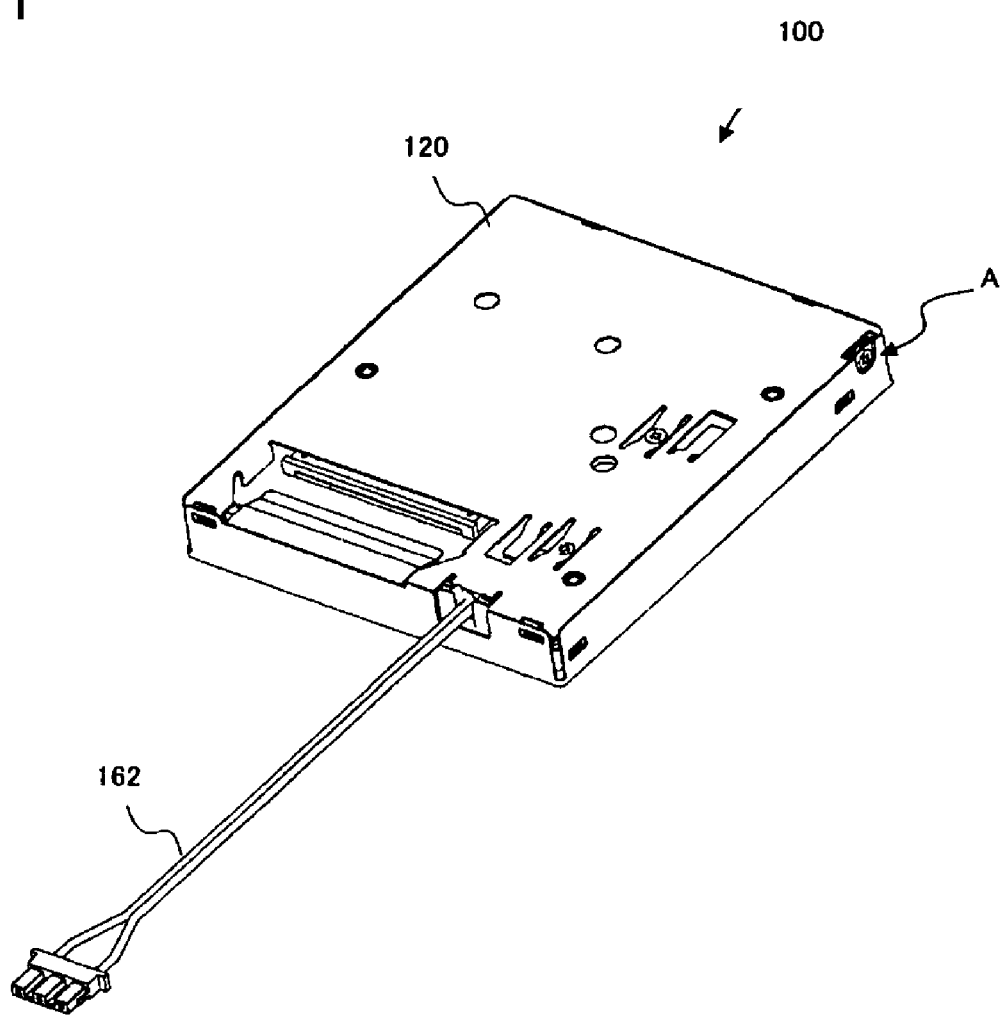
FIG. 1 is a perspective view of the external constitution of an assembled liquid crystal module shown from the back thereof.
Figure 2:
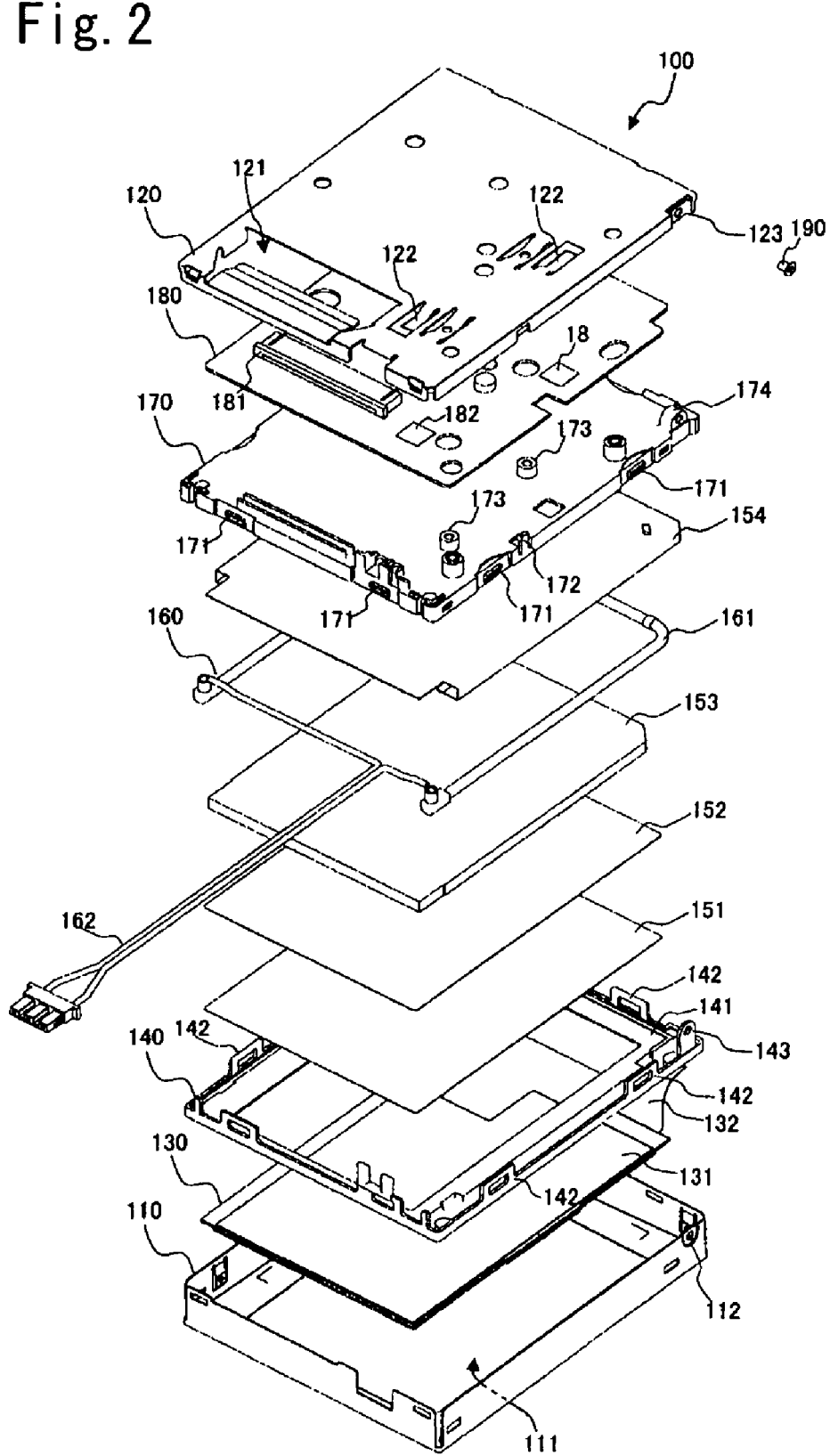
FIG. 2 is an extended elevation view of constituent elements of a stacked liquid crystal module.

FIG. 1 is the perspective view of the external constitution of an assembled liquid crystal module shown from the back thereof. FIG. 2 is the extended elevation view of constituent elements of the stacked liquid crystal module.

A liquid crystal module 100 is constituted in such a manner that a front frame 110 and a back cover 120 form a housing, and a liquid crystal panel 130, an upper case 140, an optical system (a prism sheet 151, a diffusion sheet 152, a light-guiding plate 153, a light source 160 and a reflection plate 154), a lower case 170, and a control circuit board 180 are stacked within the housing.

Both the front frame 110 and the back cover 120 are made of metal, in which a piece of plate is punched and bent to form various holes, irregular portions such as concave and convex portions and sides. To be more precise, the face of the front frame 110 is cut out in such manner as to create a display window 111 for the liquid crystal panel 130 and is formed to act as a bezel when the liquid crystal module is viewed from the front. Further, a cutout window 121 is provided on the back cover 120 for introducing a flexible wiring board (not shown) to be inserted into an electrical connector 181 on the control circuit board 180. The liquid crystal panel 130 is made up of a liquid crystal substrate 131, filled with liquid crystal between two transparent glass substrates, and a flexible wiring board 132 that sends control signals to the liquid crystal substrate 131, as the panel displays various information in response to the control signals from the control circuit board 180. Note that the flexible wiring board 132 is connected to an electrical connector (not shown) on the control circuit board 180 so as to wrap the upper case 140, the optical system 150 and the lower case 170 from outside.

In the upper case 140, a plurality of nail feet 142 to be engaged with the lower case 170 are integrally provided in an extended manner on a frame portion 141 having about the same width more or less as that of the front frame 110.

The upper case 140 is manufactured by way of resin molding using a metal mold because of its complicated shape, with conductive filler being mixed into the upper case 140, which is formed in such manner that noise from the light source 160 does not affect the liquid crystal panel 130 by grounding the case. Therefore, because it shields noise, the upper case can be referred to as a so-called noise-shielding member (shield member). A grounding method will be described later.

The prism sheet 151, the diffusion sheet 152, the light-guiding plate 153 and the reflection plate 154 are constituted so as to guide light emanating from the light source 160 efficiently and evenly toward the liquid crystal panel 130.

The light source 160 comprises a cold cathode tube 161 and a light source lead wire 162. The cold cathode tube 161 is arranged on the inner periphery of the liquid crystal module 100, while the frame portion 141 of the upper case 140 is formed along the cold cathode tube 161. It is preferable that the width of the frame portion 141 be as narrow as possible so as not to affect the display quality of the liquid crystal when the upper case 140 is fully grounded. Thus, the area for housing the liquid crystal can be widened, in other words, a compact liquid crystal display device with a wide area can be provided.

The lower case 170 serves as the pedestal of the control circuit board 180 and nails 171 to be fitted with the nail feet 142 of the upper case 140 are severally provided on corresponding positions. Like the upper case 140, the lower case 170 is also made of resin. Together with the upper case 140 via the nails 171, the lower case 170 integrally holds the optical system 150 closely together. Further, hooking nails 172 for fixing the control circuit board 180 are provided on two positions of the lower case 170 (only one of them is shown). In addition, several screw holes 173 are provided on the lower case 170 to screw down the back cover 120, and firmly affix the back cover 120 to the lower case 170. This allows the liquid crystal module 100 to be set in a vertical direction (direction perpendicular to the liquid crystal surface).

The control circuit board 180 inputs signals from outside through an electrical connector 180, processes the input signals by various circuits or the like provided on the control circuit board, and outputs them to the liquid crystal panel 130. Meanwhile, since noise is easily generated on the electrical circuit particularly in the vicinity of the electrical connector 181, a board circuit exposure portion 182 for grounding is provided near the electrical connector 181, and it is grounded by a leaf spring 122 on the back cover 120 in order to maintain liquid crystal display quality.

Next, description will be made for the grounding method of the upper case 140 (shield member). The shield member of the liquid crystal module 100 is made of resin and is grounded by allowing it to be screwed down to a metal housing. The liquid crystal module 100 of this embodiment applies to a liquid crystal display device adapted for automobiles, and is presumed to be useful even under extremely severe conditions, such as high temperature or low temperature depending on the use environment, and where the application of vibration is a constant factor, with vibration being large in scope in certain cases. Accordingly, when metal and resin are simply screwed down, they could come loose or develop fatigue after prolonged use. The embodiment of the invention is therefore designed to make the metal front frame 110 and the metal back cover 120 sandwich and screw down the end portions of the resin upper case 140 acting as shield member.

Figure 3A:
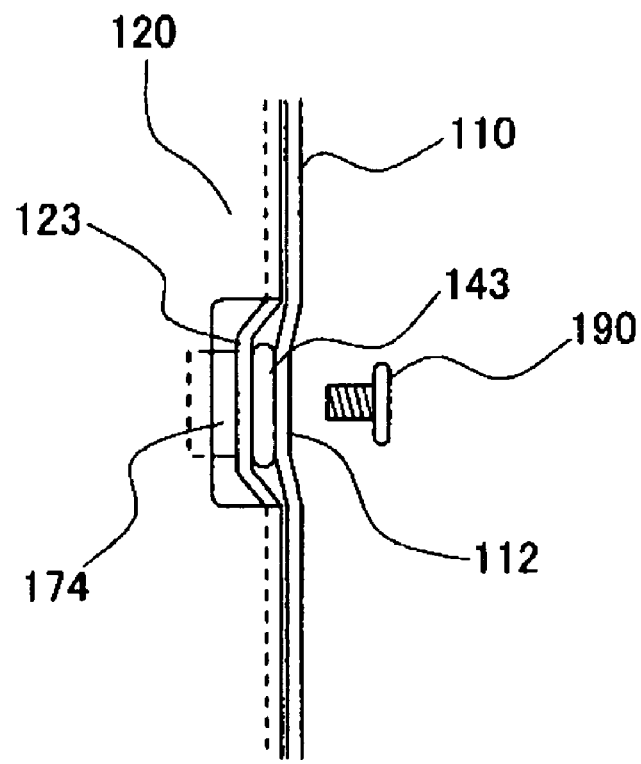
FIG. 3A is an enlarged side view of a joint portion indicated by reference code A in FIG. 1.
Figure 3B:
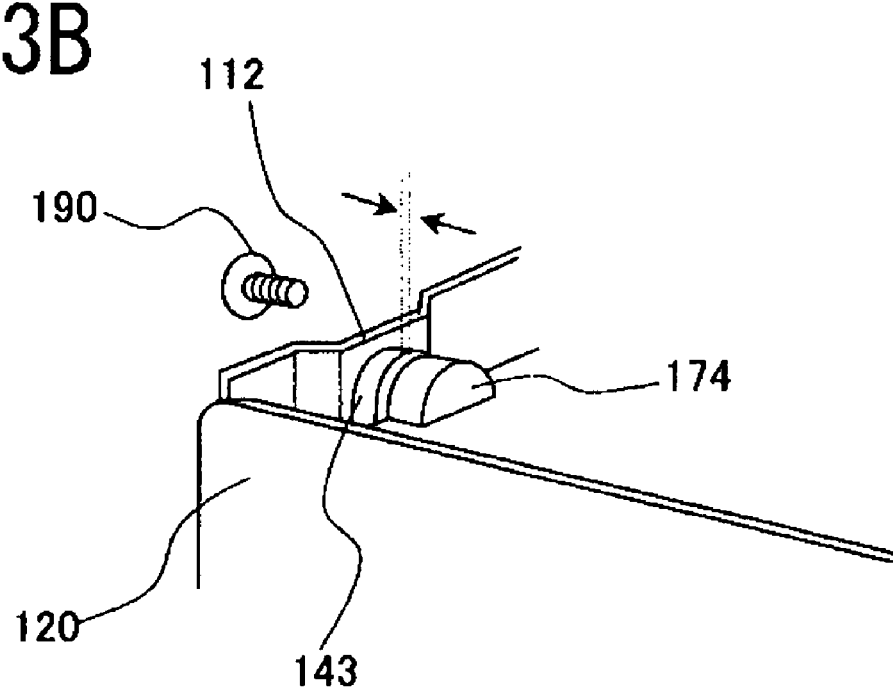
FIG. 3B is a perspective view of the joint portion.

FIG. 3A is the enlarged side view of the joint portion indicated by reference code A in FIG. 1, while FIG. 3B is a perspective view of the joint portion. In the joint portion, a joint 112 of the front frame 110, a joint 143 of the upper case 140, a joint 123 of the back cover 120 and a joint 174 of the lower case 170 are disposed sequentially from outside with holes formed in the joints horizontally aligned with the display surface of the liquid crystal module 100, and the joints are joined by a metal screw 190.

The diameter of the screw 190 is sufficient to enable it to join the holes of the two metal plates (the joint 112 of the front frame 110 and the joint 143 of the upper case 140). Thus, the sturdy metal plates are fastened to each other and pressed from both sides, so that fatigue or loosening will not likely occur in the resin upper case 140 laid between them. In this manner, grounding is secured and it becomes possible to stably shield the liquid crystal panel 130 from the effect of noise emanating from the cold cathode tube 161 for a long period of time.

Note that the liquid crystal module 100 is constructed in such manner that the outermost joint 112 is recessed to the extent required to fit the head of the screw 190 to align the face of one side (of the housing) of the front frame 110. Further, the screw 190 is allowed to enter sideways, that is, horizontally in relation to the display surface of the liquid crystal module 100. In this manner, therefore, the width of the liquid crystal module 100 does not increase while convex portions are not formed on the sides of the housing. In contrast, if the screw 190 is allowed to enter from a vertical direction, it must be long enough to firmly fix the housing, making the liquid crystal module 100 thicker in the vertical direction, that is, such direction which is perpendicular to the display surface of the liquid crystal module 100. However, if the construction of the liquid crystal module 100 is such that the screw 190 is allowed to enter sideways, it is required to be as thick as the diameter of the screw 190 only even if the screw 190 is made longer.

Further, electrical connectors and IC chips are mounted on the control circuit board 180, which inevitably must be of a certain height and thickness. The above-described joints (joint 112, joint 143, joint 123, and joint 174) are housed within the range of height of the control circuit board 180 without increasing its thickness. This factor is important in designing the module for automobiles, in view of the limited space in which it is attached, as illustrated in the embodiment of the present invention.

As described above, by effectively utilizing the dimensions of width and thickness, the housing capacity of the liquid crystal module 100 can be made small for the display surface and substantially formed in the shape of a rectangular parallelepiped. Particularly, since various metric devices need to be mounted within a limited space, such as the vicinity of the driver's seat of an automobile, it would be preferable to utilize a liquid crystal module which provides a relatively wide screen without affecting the housing shape of such other metric devices, such as the liquid crystal module 100.

Meanwhile, since the front frame 110, the back cover 120, the upper case 140 and the lower case 170 are affixed by screwing them downwardly in a direction parallel to the liquid crystal surface, it may be concluded that the improved quake-resistance performance of the liquid crystal module 100 may be attributed in conjunction with the screwing down method in a vertical direction.

The present invention is likewise applicable for ships and aircraft where the liquid crystal display device is used in an environment subject to frequent vibration.

According to the present invention, the screws do not directly fasten the shield member, which is attached between the metal pieces (sheet metal) so as not to cause any fatigue, making highly reliable ground connection achievable even when used in an environment with a high frequency of vibration. In addition, because the screws are attached sideways, there is no resulting increase in the size of the liquid crystal display device, whose housing capacity for the display surface can be made small, having substantially no convex portion in the periphery of the housing since convex portions are not formed on the sides thereof.

Further, according to the present invention, the pedestal as well as the circuit board are both horizontally and vertically affixed to the liquid crystal surface, as a result of which they are less affected by the effects of vibration, such as slippage and shaking.

Furthermore, according to the present invention, the perforated joint pieces are merely formed by opening holes on the sides of the housing, and thus the liquid crystal display device can be manufactured simply. Additionally, since the periphery of the device is encased in a metal housing except for its liquid crystal surface, the liquid crystal display device is not easily affected by other electromagnetic waves and high quality display can thus be achieved.

Still further, as explained above, according to the present invention, greater freedom in formulating product design is possible.

What is claimed is:

1. A liquid crystal display device where a light source is disposed on the inner periphery of a liquid crystal module, said device comprising:
   a metal front bezel and a metal back cover, which constitute the housing of the liquid crystal module; and
   a conductive shield member that is laid between a liquid crystal panel and the light source, wherein
   perforated joint pieces, which are bent vertically and integrally formed on the outer end portions of the said front bezel, the outer end portions of the said shield member and the outer end portions of the said back cover are severally provided at positions overlapping with each other when the liquid crystal module is assembled, and
   the perforated joint pieces of the shield member are sandwiched between the perforated joint pieces of the front bezel and the perforated joint pieces of the back cover in order to make the joint pieces attachable to each other by screws.

2. The liquid crystal display device according to claim 1, wherein the end portions of the said front bezel and the said back cover are bent to provide side portions constituting the sides of the housing, and one of the side portions is made to serve as a perforated joint piece.

3. The liquid crystal display device according to claim 1, wherein the said housing is a rectangular parallelepiped having substantially no convex portion.

4. The liquid crystal display device according to claim 3, wherein the said liquid crystal display device is designed for any one of automobiles, ships and aircraft.

5. A liquid crystal display device where a light source is disposed on the inner periphery of a liquid crystal module, said device comprising:

a metal front bezel and a metal back cover, which constitute the housing of the liquid crystal module; and a conductive shield member that is laid between a liquid crystal panel and the light source, wherein perforated joint pieces, which are bent vertically and integrally formed on the outer end portions of the said front bezel, the outer end portions of the said shield member and the outer end portions of the said back cover are severally provided on positions overlapping with each other when the liquid crystal module is assembled, the perforated joint pieces of the shield member are sandwiched between the perforated joint pieces of the front bezel and the perforated joint pieces of the back cover in order to make the joint pieces attachable to each other with the aid of screws, a pedestal of a liquid crystal control circuit board is further laid between the light source and the back cover, perforated joint pieces, which are bent vertically to the surface of the liquid crystal control circuit board are provided integrally on the outer end portions of the pedestal, and the perforated joint pieces are also made attachable by the said screws.

6. The liquid crystal display device according to claim 5, wherein the end portions of the said front bezel and the said back cover are bent to provide side portions constituting the sides of the housing, and one of the side portions is made to serve as the said perforated joint piece.

7. The liquid crystal display device according to claim 5, wherein the said housing is a rectangular parallelepiped having substantially no convex portion.

8. The liquid crystal display device according to claim 7, wherein the said liquid crystal display device is designed for any one of automobiles, ships and aircraft.

* * * * *